H. J. MURRAY.
AUTOMATIC ELECTRIC GEAR SHIFT.
APPLICATION FILED JAN. 18, 1915.

1,268,267.

Patented June 4, 1918.
2 SHEETS—SHEET 1.

WITNESSES

INVENTOR
Howard J. Murray
BY
ATTORNEYS

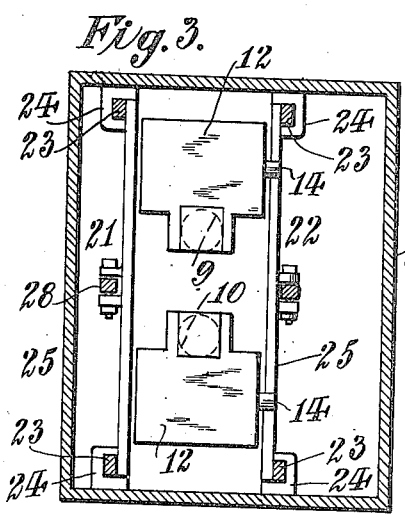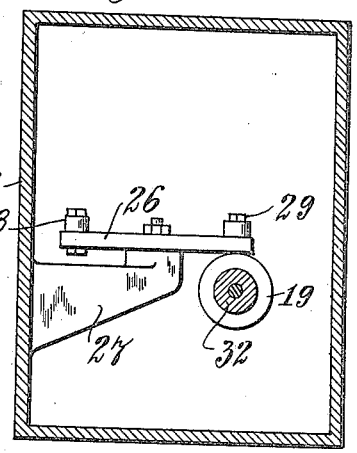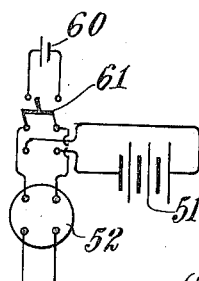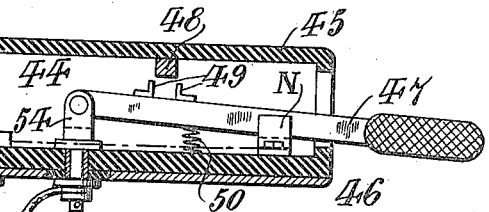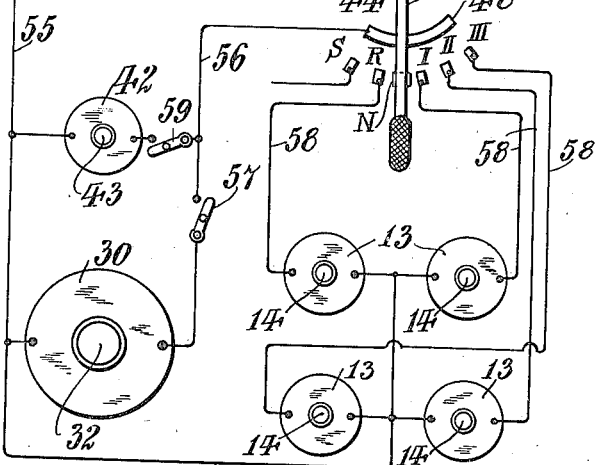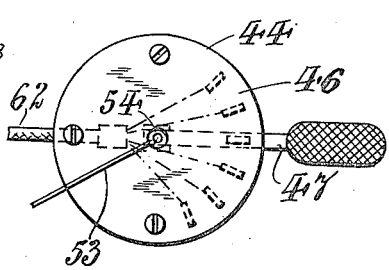

UNITED STATES PATENT OFFICE.

HOWARD J. MURRAY, OF BROOKLYN, NEW YORK.

AUTOMATIC ELECTRIC GEAR-SHIFT.

1,268,267.         Specification of Letters Patent.     Patented June 4, 1918.

Application filed January 18, 1915. Serial No. 2,951.

*To all whom it may concern:*

Be it known that I, HOWARD J. MURRAY, a citizen of the United States, and resident of the borough of Brooklyn, in the county of Kings and State of New York, have invented certain new and useful Improvements in Automatic Electric Gear-Shifts, of which the following is a specification.

My invention relates in general to an automatically governed safety mechanism for selectively actuating one or more devices in proper operative sequence from a single control station and specifically relates to an automatic electric gear shift and clutch control for motor vehicles.

One of the general objects of the invention is to provide a simple form of electrically energized control for selecting and actuating, from a single electromagnet, one of a plurality of operating members in a desired synchronism with another mechanism having a coöperative action with the selected operating member.

Another object is to provide such a device capable of being actuated mechanically or manually at will while electrically controlled in its selective functions.

Among the specific objects of the invention when considered in connection with its application to a gear shifting device is to control a clutch automatically in its timed movement relative to the shifting of the gears, to shift the gears without the release of any restraining device or the employment of any tension to hold the gears in set position.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Referring to the accompanying drawings.

Figure 1:
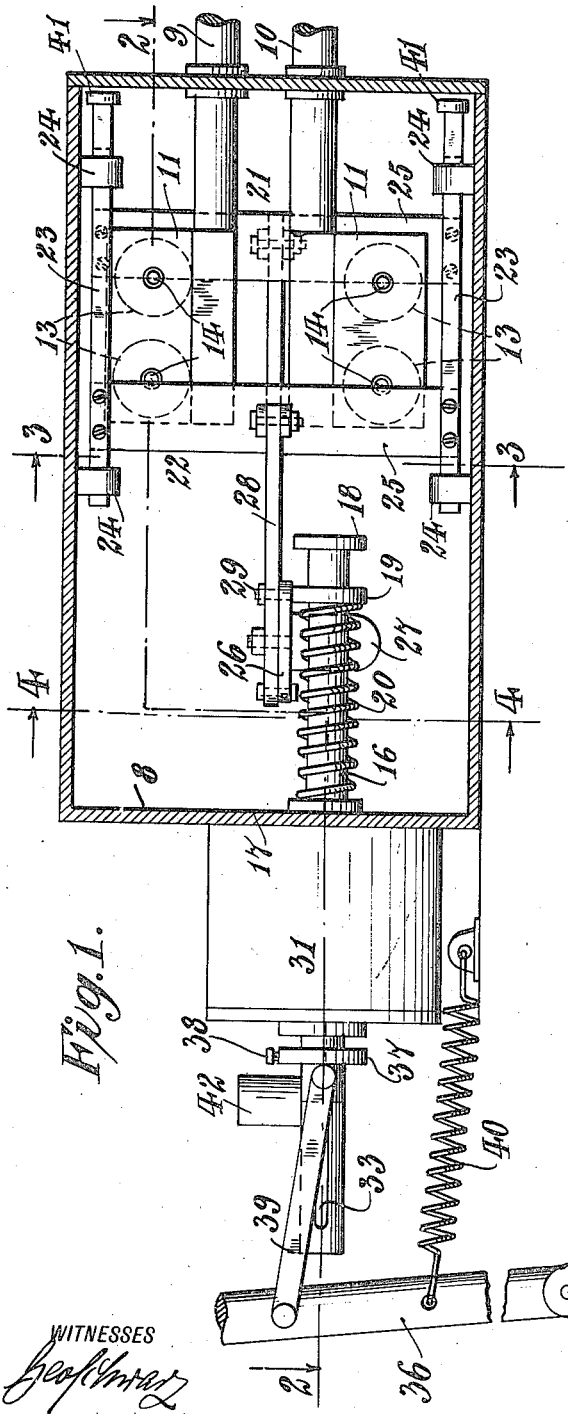
Figure 1 is a side elevation of one form of my invention with the front side of the mechanism-containing casing removed to show internal construction.

Figs. 3 and 4 are transverse sectional views taken respectively on the lines 3—3 and 4—4 of Fig. 1, looking in the direction indicated by the arrows;

Fig. 5 is a diagrammatic view of some of the mechanism of Fig. 1 together with certain electrical connections;

Fig. 6 is a plan view of the underside of the control switch; and

Fig. 7 is an enlarged vertical sectional view through a portion of the switch shown in Fig. 6.

As the invention may be admirably embodied in a gear shifting mechanism for automobiles it will be described in connection with such a device but it will be readily appreciated that the invention is not so limited but may be utilized wherever an electrically controlled selective means is utilized to govern the coöperative actuation of different mechanical elements. In the following description and in the claims, parts will be identified by specific names for convenience of expression but they are intended to be as generic in their application to similar parts as the art will permit.

In the drawings there is illustrated a mechanism containing casing 8 which may be mounted at any suitable place on an automobile and which has a pair of parallelly disposed gear shifting rods 9 and 10 extending through one end of the casing and mounted for reciprocatory movement in either longitudinal direction to shift the different speed gears usually found in automobile construction. While but two rods are illustrated it is readily appreciated that any number of such rods may be actuated from the mechanism hereinafter disclosed with obvious mechanical changes and the description of any one rod and its connections will cover any number of such rods. The end of each of the rods within the casing has a selective magnet casting 11 fixed thereto and each casting is preferably in the form of a pair of boxes 12 positioned longitudinally of the rod. Each box contains a selective electromagnet 13 of the plunger type, the plungers 14 of which have a length slightly greater than the depth of the box with one of the plungers normally projecting through one side of its box and the other plunger correspondingly projecting through the opposite side of its box. Each plunger has a spring 15 acting therein to maintain the same in its normally projected position, and the plungers are arranged so that when the electromagnet controlling either one is energized the plunger thereof will be withdrawn from its normally projected position in the path of one of the pair of slide bars hereinafter described and ejected into the path of the other slide bar.

The shifting rods are moved through slide bars and slide frames hereinafter described by an actuator rod 16 slidably mounted in the end 17 of the casing opposite the end having the gear shifting rods, for longitudinal movement parallel to the movement of these rods. The end of the actuator rod within the casing is defined by a collar 18 and has a spring collar 19 slidably mounted thereon normally spaced from the fixed collar 18 a distance equal to the throw of a clutch hereinafter described. A shifter spring 20 is positioned between the spring collar 19 and the adjacent wall of the casing and tends to maintain the actuator rod in the normally idle position shown in Figs. 1 and 2.

Figure 2:
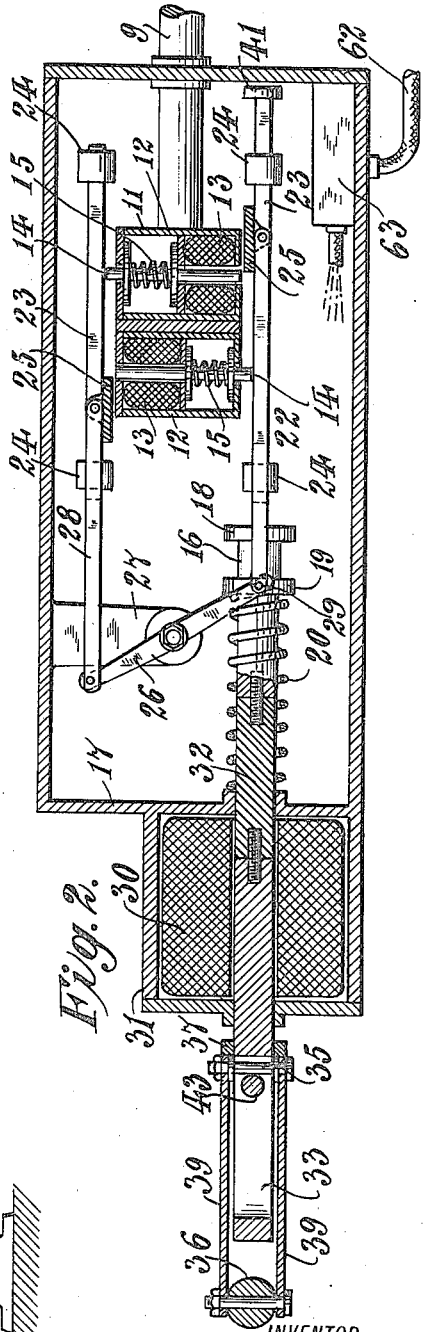
Fig. 2 is a horizontal sectional view taken on the irregular line 2—2 of Fig. 1 looking in the direction indicated by the arrows.

A pair of parallelly disposed sliding frames 21 and 22 are mounted for reciprocatory movement parallel to the movement of the shifter rods and are positioned on opposite sides of the pair of castings 11. Each frame is formed of a pair of spaced slide bars 23 mounted in brackets 24 fixed to the casing and connected by means of a slide plate 25 having a movement across the side of the castings parallel to the movement of the shifter rods. When the slide frames are in normal position as shown in Fig. 2 each of the slide plates is offset in advance of any possible position of projected plungers 14. The frames are connected so as to move simultaneously in opposite directions by means of a shifter lever 26 pivoted intermediate its length to a bracket 27. One of the frames such as the rear frame 21 is linked to one arm of the lever 26 by means of a bar 28. The front frame 22 is in the plane containing the axis of the rod 16 and this frame and the other arm of the lever are pivotally connected to the spring collar 19 by means of a pivot pin 29.

The rod 16 is moved outwardly of the casing by means of an actuator electromagnet 30 mounted within a container 31 fixed to the end 17 of the casing. The actuator rod extends through the windings of the electromagnet 31 and includes a soft iron insert 32 constituting the plunger for this electromagnet. The outer end of the rod exteriorly of the container, is provided with a slot 33 having a length equal to the maximum movement of the rod. Within this slot is slidably mounted a pin 35 constituting a pin and slot connection with a clutch control member represented diagrammatically by a lever 36. This connection includes a slot collar 37 slidable on the rod and fixed thereto by the set screw 38. A pair of clutch control bars 39 have one end of each pivoted to the pin 35 and the opposite ends pivoted to the clutch lever 36, so as to transmit motion between the lever and rod. A clutch spring 40, which may be the usual clutch spring found on automobiles acts on the lever 36 to move the actuator rod into its normal position. This spring is arranged to act on the rod even after the shifter spring 20 has moved into its fully expanded idle position so as to act on the lever 36 to move the same into position to throw "in" the clutch. A stop collar 41 may be placed on one of the slide bars to limit the projected position of the shift frames under the action of the clutch spring.

Should it be desired to operate the gear shifting rods by some force other than by the electric energy, the electromagnet 30 may be omitted from the system and a clutch control locking magnet 42 may be mounted on the external end of the actuator rod. This electromagnet is provided with a plunger 43 adapted to be projected across the slot 34 in advance of the pin 35 to lock the same to the rod. The supply of current through the several electromagnets is controlled by a switch 44 (Figs. 6 and 7) which may be mounted on top of the steering wheel of the vehicle or in any other position convenient to the operator. This switch comprises a box having a top plate 45 and a bottom plate 46 with a lever 47 constituting the hand control of the switch mounted therebetween and pivoted at one end for universal movement. A segmental contact strip 48 is disposed concentrically of the pivoted end of the lever preferably on the underside of the top plate 45 and adapted to be positioned between a pair of contacts 49 on the lever to complete the circuit therethrough when the lever is raised. A series of V-contacts, five in number, and lettered progressively S, R, N, I, II, III, to indicate respectively starter, reverse, neutral, first, second and third speeds, are disposed in an arc to the outside of the plate and in position to have the circuit completed therethrough when the lever is brought into engagement therewith, and so spaced from the strip 48 that the lever is out of physical and electrical contact with the strip when in complete engagement with any of the terminal contacts. The contact S may be connected with an electric self starter or any other mechanism which it may be desired to control from the switch.

A source of electric energy 51 of a strength sufficient to actuate both the heavy actuator magnet 30 and the selective electromagnets 13 is connected through a snap switch 52 with the electromagnets and with the control 44. A conductor 53 leads from one pole of the switch 52 to the pivot pin 54 of the lever so as to lead the current thereto and a return conductor 55 leads from the other pole of the switch to one side of each of the electromagnets. A conductor 56 connects the plate 48 with the other side of the electromagnet 30 through a hand controlled switch 57.

In the form illustrated only four selective electromagnets are needed to provide the four shifts possible with the two gear shifting rods illustrated and conductors 58 lead from opposite sides of each of the selective electromagnets to the contacts R, I, II, III, leaving the contact N "dead". A spring 50 acts on the lever with a strength sufficient to insure contact of the lever with the strip 48 in case the lever should be jarred loose of the terminal contacts on the bottom plate.

The clutch locking electromagnet 42 is connected across the conductors 55 and 56 through a snap switch 59. A small dry battery 60 may be substituted for the source 51 and the system connected with either source by a two-throw switch 61. The different conductors leading from the control switch 44 to the mechanism shown in Fig. 1 is contained in a cable 62 leading from the underside of the switch to a distribution box 63 fixed to the inner side of the casing. The several conductors lead from the box 64 to the several electromagnets and are arranged so as to permit the free movement of the electromagnets connected thereto.

In operation, and with the parts arranged as shown in Figs. 1 and 2 in which it is assumed that the vehicle is standing with the engine running, the clutch "in", the control lever at neutral, the snap switch turned on and the clutch locking plunger "out", the operator lifts the lever from its neutral position which promptly brings it in contact with the contact strip and current passes through the winding of the actuator magnet 30 to produce a magnetic field which will act on the actuator rod plunger to draw the same into the electromagnet and move the rod toward the left of Figs. 1 and 2. The motion of this rod will be transmitted directly to the slot collar when fastened to the actuator rod, and through the collar will be exerted on the clutch lever to throw "out" the clutch. The magnetic field of the actuator magnet will continue to act on the actuator rod moving the actuator rod collar 18 into engagement with the spring collar 19, by which time the clutch is fully "out". Moving the spring collar to the left will act directly on the front slide frame 22 to move the same toward the left and will simultaneously act through the lever 26 to move the rear slide frame 21 to the right and this movement will continue until the rod has reached its maximum displacement with the shifter spring fully compressed. Should either of the gear shifting rods 9 and 10 be in any other position than that of neutral, they will be returned to neutral as one or the other, or both, of the slide bars 25 will come in contact with the ejected plunger of one or more of the selective electromagnets and act on the plunger to return its rod to its neutral position.

Should it be desired to shift a set of gears to obtain one of the speeds reverse or forward as, for instance, the first speed forward, the operator moves the shift control lever into position above the contact I during which movement the actuator magnet continues to be energized as current is constantly supplied thereto due to the continued engagement of the lever with the contact strip. The lever is then pressed into its first speed position and current will pass from the source through the lever, the contact I, the conductor 58 attached thereto through that selective electromagnet, which will make the desired shift of gears and then through the return conductor 55 back to the source. As the shift control lever is pushed down into position, the pair of contacts 49 remain in electric connection with the strip 48 until after the lever has made its initial engagement with the contact I. When the shift control lever is fully pushed into its first speed position, electric contact is broken with the strip and the actuator electromagnet 30 becomes deënergized. When the actuator rod is free of its magnetic restraint, the energy stored in the shifter spring and in the clutch spring is free to exert itself and promptly acts on the actuator rod to move the rear slide frame to the right and simultaneously to move the front slide frame to the left of Fig. 1. The selective magnet plunger actuated by the closing of the circuit through the contact I is in the path of one of the slide bars 25 and this bar bears against the side of the projected plunger and therethrough acts on the shifting rod carrying the energized electromagnet to move the same in the direction to make the desired shift of gears. This movement will continue until the shifter spring has exhausted its energy in which position the desired combination of gears will be fully in mesh. Up to this time the clutch is still "out", but the actuator rod is moved farther by the clutch spring 40 beyond the throw of the shifter spring, which acts to throw the clutch "in" and separates the collars into their normally spaced position, as described. It is possible for the operator to hold the clutch lever against the action of its spring, in which case the gears can be shifted when desired and the clutch let "in" at will after the gears have been shifted.

By loosening the slot collar 37, the actuator rod may have a free movement independent of the clutch and the gears shifted alone by means of their electric control or the clutch lever may be actuated independently of the device.

Should it be desired to eliminate the magnetic actuation of the actuator rod, the switch 57 may be opened and the switch 59 closed, thus cutting the electromagnet 30 out of the system and placing the electromagnet 42 in circuit with the strip 48 so that as the lever makes contact with the strip, the plunger 43 is ejected across the slot 33 to fasten the rod 16 to the clutch lever 36. Any movement of the clutch lever when moved by manual or other power applied directly thereto or to the clutch mechanism is transmitted to the rod and thus the gears are shifted in the same manner as before described. If desired, the source 51 of electric energy may also be cut-out of the system by reversing the two-throw switch 61 to connect an auxiliary battery so as to supply the electricity necessary to actuate the small electromagnet 42 and the small selective magnets.

By means of a device of this character it is possible to control the parts automatically so as to throw "out" the clutch, to throw "out" or return to neutral any gear combination, to thrown "in" any desired gear combination and to allow the clutch to be operated at will after the gear is shifted without affecting the gear in its shifted position, or to allow the clutch to be thrown "in" by manual and foot control. It is also possible to shift the gears selectively and throw "out" the clutch by manual power, which returns the gear shifting rods to neutral thus automatically destroying all gear combinations. The arrangement disclosed permits the clutch to be returned to its "in" position by manual control which will act to first throw in any selected gear combination and then allow the clutch to move to its "in" position after which the clutch can be moved "out" of "in" without affecting the set position of the selection gear. Disconnecting the gear shift from the clutch mechanism permits the actuation of either one independently of the other. The clutch is controlled in proper synchronism with the gear shifting and the gears may be shifted with no other tension than that normally required to hold them in place. The shifting device may be returned to neutral without the release of any restraining device such as holding springs and should the gears tend to work out of mesh the unseating action thereof will be resisted by the shifter spring which will tend to return the same into their present position.

Only one actuator electromagnet is necessary to obtain the plurality of motions of the shifting rods in either of their reciprocatory direction.

Having thus described my invention, I claim:

1. In a device of the class described, a controlling member, an actuator rod normally disengaged from the controlling member, a spring for moving said rod in one direction, magnetically controlled means for moving said rod in the other direction to place the spring under tension, said magnetically controlled means acting through the rod to shift said controlling member and move the same into a predetermined position.

2. In a device of the class described, a pair of controlling members, an actuator rod adapted to be connected at will to operate either one of said members, a spring for moving said rod in one direction, magnetically controlled means for moving said rod in the other direction to place the spring under tension, said magnetically controlled means acting through the rod to shift one of said controlling members into a predetermined position and means connecting said rod and member thereby to move said member under the released force of said tensioned spring.

3. In a device of the class described, a controlling member, an actuator rod, a spring for moving said rod in one direction, magnetically controlled means for moving said rod in the other direction to place the spring under tension, said magnetically controlled means acting through the rod to engage said controlling member and move the same into a set position and a magnetically controlled connection for uniting said rod and member thereby to move said member under the force of said tensioned spring.

4. In a device of the class described, the combination of an actuator rod, a spring for moving said rod in one direction, magnetically controlled means for moving said rod in the opposite direction and to energize said spring, said spring being free to move the rod as the said means become inoperative, mechanism actuated by the rod when moved by the released force of said energized spring and means in addition to said spring and magnetically actuated for actuating said rod.

5. In a device of the class described, the combination of an actuator rod, a spring for moving said rod in one direction, magnetically controlled means for moving said rod in the opposite direction and to energize said spring, a clutch lever actuated by said rod, said spring being free to move the rod as the said means become inoperative and mechanism actuated by the rod when moved by the released force of said energized spring.

6. In a device of the class described, the combination of an actuator rod, two springs acting on said rod to move the same in one direction, one of said springs having an action on the rod after the action of the other spring has terminated, mechanism actuated by the rod when under tension of both springs, other mechanism actuated by the further movement of the rod when under tension of the longer acting spring and magnetically energized means acting on said rod to move the same in the direction to place the springs under tension.

7. In a device of the class described, the combination of an actuator rod, two springs acting on said rod to move the same in one direction, one of said springs having an action on the rod after the action of the other spring has terminated, mechanism actuated by the rod when under tension of both springs, other mechanism actuated by the further movement of the rod when under tension of the longer acting spring, magnetically energized means acting on said rod to move the same in the direction to place the springs under tension, a controlling rod and means for connecting said rod with said first named mechanism.

8. In a device of the class described, the combination of an actuator rod, two springs acting on said rod to move the same in one direction, one of said springs having an action on the rod after the action of the other spring has terminated, mechanism actuated by the rod when under tension of both springs, other mechanism actuated by the further movement of the rod when under tension of the longer acting spring, magnetically energized means acting on said rod to move the same in the direction to place the springs under tension, a plurality of controlling rods and selective means for connecting any one of said controlling rods with said first named mechanism.

9. In a device of the class described, the combination of an actuator rod, two springs acting on said rod to move the same in one direction, one of said springs having an action on the rod after the action of the other spring has terminated, mechanism actuated by the rod when under tension of both springs, other mechanism actuated by the further movement of the rod when under tension of the longer acting spring, magnetically energized means acting on said rod to move the same in the direction to place the springs under tension, a plurality of controlling rods and magnetically controlled selective means for connecting any one of said controlling rods with said first named mechanism.

10. In a device of the class described, the combination of a clutch controlling member, magnetically actuated means including a rod operatively connected to said member to throw "out" the clutch, a spring adapted to be placed under tension by the movement of said rod in throwing "out" the clutch, said spring engaging said member to throw "in" the clutch after the magnetically actuated means has ceased to operate.

11. In a device of the class described, the combination of a clutch controlling member, magnetically actuated means including a rod operatively connected to said member to throw "out" the clutch, a spring adapted to be placed under tension by the movement of said rod in throwing "out" the clutch, said spring engaging said member to throw "in" the clutch after the magnetically actuated means has ceased to operate, connecting means between said rod and member and magnetically controlled means for governing the connecting means between said member and rod.

12. In a device of the class described, the combination of a clutch controlling member, electrically energized power means operatively connected to said member to reciprocate the same in one direction to throw "out" the clutch and in the other direction to throw "in" the clutch, a gear shifting rod, a connection between said member and said rod connecting said member to the rod during the movement of the same in throwing "out" the clutch thereby to move said gear shifting rod into set position.

13. In a device of the class described, the combination of a clutch controlling mechanism, a magnetically controlled reciprocating member operatively connected to said mechanism to move the same in one direction to throw "out" the clutch and in the other direction to throw "in" the clutch, a gear shifting rod, means for connecting said rod with said member during the movement of the member in the direction to throw "in" the clutch, thereby to actuate said gear shifting rod, said member having no action on the mechanism while moving the gear shifting rod and a connection between said member and mechanism operable to throw "in" the clutch after the gear shifting rod has been actuated.

14. In a device of the class described, the combination of a clutch controlling mechanism, a reciprocating member operatively connected to said mechanism to move the same in one direction to throw "out" the clutch and in the other direction to throw "in" the clutch, a gear shifting rod, magnetically controlled means for connecting said rod with said member during the movement of the member in the direction to throw "in" the clutch, thereby to actuate said gear shifting rod, said member having no action on the mechanism while moving the gear shifting rod and a connection between said member and mechanism operable to throw "in" the clutch after the gear shifting rod has been actuated.

15. In a device of the class described, the combination of a clutch controlling mechanism, a reciprocating member operatively connected to said mechanism to move the same in one direction to throw "out" the clutch and in the other direction to throw "in" the clutch, a plurality of gear shifting rods, means for connecting any one of said rods with said member, a gear shifting rod, means for connecting said rod with said member during the movement of the member in the direction to throw "in" the clutch, thereby to actuate said gear shifting rod, said member having no action on the mechanism while moving the gear shifting rod and a connection between said member and mechanism operable to throw "in" the clutch after the gear shifting rod has been actuated.

16. In a device of the class described, the combination of a clutch controlling mechanism, a reciprocating member operatively connected to said mechanism to move the same in one direction to throw "out" the clutch and in the other direction to throw "in" the clutch, a plurality of gear shifting rods, magnetically actuated selective means for connecting any one of said rods with said member, a gear shifting rod, means for connecting said rod with said member during the movement of the member in the direction to throw "in" the clutch, thereby to actuate said gear shifting rod, said member having no action on the mechanism while moving the gear shifting rod and a connection between said member and mechanism operable to throw "in" the clutch after the gear shifting rod has been actuated.

17. In a device of the class described, the combination of a clutch controlling mechanism, an actuator rod mounted for reciprocatory movement, a connection between said rod and mechanism to move said mechanism into position to throw "out" the clutch as the rod moves in one direction and having a delayed engagement with the mechanism when moving in the direction to throw "in" the clutch, a gear shifting rod and means for connecting said gear shifting rod to said actuator rod to move the gear shifting rod during the portion of the movement of the shifter rod while traveling in the direction to throw "in" the clutch and preceding the connection of the shifter rod with the clutch controlling mechanism whereby said gear shifter rod will be actuated before the clutch is thrown "in."

18. In a device of the class described, the combination of a clutch controlling mechanism, an actuator rod mounted for reciprocatory movement, magnetically controlled means operatively connected to said rod to move the same in one of its reciprocatory directions, a connection between said rod and mechanism to move said mechanism into position to throw "out" the clutch as the rod moves in one direction and having a delayed engagement with the mechanism when moving in the direction to throw "in" the clutch, a gear shifting rod and means for connecting said gear shifting rod to said actuator rod to move the gear shifting rod during the portion of the movement of the shifter rod while traveling in the direction to throw "in" the clutch and preceding the connection of the shifter rod with the clutch controlling mechanism whereby said gear shifter rod will be actuated before the clutch is thrown "in."

19. In a device of the class described, the combination of a clutch controlling mechanism, an actuator rod mounted for reciprocatory movement, a magnetically controlled means designed to be controlled from a distance for energizing said rod, a connection between said rod and mechanism to move said mechanism into position to throw "out" the clutch as the rod moves in one direction and having a delayed engagement with the mechanism when moving in the direction to throw "in" the clutch, a gear shifting rod and magnetically controlled means for connecting said gear shifting rod to said actuator rod to move the gear shifting rod during the portion of the movement of the shifter rod while traveling in the direction to throw "in" the clutch and preceding the connection of the shifter rod with the clutch controlling mechanism whereby said gear shifter rod will be actuated before the clutch is thrown "in."

20. In a device of the class described, the combination of a clutch controlling mechanism, an actuator rod mounted for reciprocatory movement, a connection between said rod and mechanism to move said mechanism into position to throw "out" the clutch as the rod moves in one direction and having a delayed engagement with the mechanism when moving in the direction to throw "in" the clutch, a gear shifting rod and magnetically controlled means for connecting said gear shifting rod to said actuator rod to move the gear shifting rod during the portion of the movement of the shifter rod while traveling in the direction to throw "in" the clutch and preceding the connection of the shifter rod with the clutch controlling mechanism whereby said gear shifter rod will be actuated before the clutch is thrown "in," a single switch for controlling both of said magnetically controlled means, one of said magnetically controlled means being inactive while the other is functioning.

21. In a device of the class described, a clutch control mechanism, an actuator rod connected thereto, magnetically controlled means for actuating said mechanism and rod simultaneously, a spring connected to said rod and placed under tension by the movement of the actuator rod in one direction, a gear shifting rod adapted to be connected to said actuator rod when acted upon by said tensioned spring and to be moved by the actuator rod into gear setting position, said rod shifting spring acting on said gear shifting rod to maintain the same resiliently in its gear setting position.

22. In a device of the class described, the combination of a manually actuated clutch control mechanism, a gear shifting rod and magnetically controlled means for connecting said mechanism with said rod whereby the shift rod may be actuated by manual power applied to said mechanism.

23. In a device of the class described, the combination of a manually actuated clutch control mechanism, a gear shifting rod, magnetically controlled means for connecting said mechanism with said rod whereby the shift rod may be actuated by manual power applied to said mechanism, and means forming a connection between said rod and mechanism to return said rod to normal position as the mechanism is actuated.

24. In a device of the class described, the combination of a manually actuated clutch control mechanism, including a sliding frame mounted to reciprocate a plurality of gear shifting rods, electromagnetic selective means for connecting said sliding frame with any one of said rods whereby said connected rod may be actuated manually by the movement of said mechanism, said mechanism provided with means for connecting at will an electric motor thereto, thereby to actuate the mechanism by means of a motor.

25. In a device of the class described, the combination of a manually actuated clutch control mechanism, an actuating means, means for connecting said mechanism and means, a plurality of gear shifting rods and magnetically controlled selective means for connecting said actuating means with any one of said rods whereby said connected rod may be actuated by the movement of said mechanism or the mechanism may be actuated independently of the actuating means.

26. In a device of the class described, the combination of a clutch control mechanism, a magnetically controlled and spring actuating gear shifting mechanism, means coöperatively connecting said mechanisms so that the gear can be shifted only when the clutch control mechanism is in position to cause the clutch to be "out" and resilient means acting on said clutch control mechanism tending to move the same into position to throw "in" the clutch.

27. In a device of the class described, the combination of a clutch control mechanism, a gear shifting mechanism, means coöperatively connecting said mechanisms so that the gears can be shifted only when the clutch control mechanism is in position to cause the clutch to be "out" and magnetically actuated means including an electromagnet provided with a plunger attached to said clutch control mechanism for controlling the movement of said clutch control mechanism.

28. In a device of the class described, the combination with a plurality of gear shifting rods, a slide plate adapted to engage said rods to shift the same, a spring acting on said plate to hold the gears resiliently in set position when shifted by the rods and means acting on said plate for shifting the rods and for placing said spring under tension.

29. In a device of the class described, the combination of a gear shifting rod, means for moving said rod into gear setting position, said means including a spring acting on said rod thereby to hold the gears resiliently in set position and means coöperatively connected with said first named means to release the engagement of the spring with said gear shifting rod and to move the rod into a normal position with the gears in unset position and released from the action of the spring.

30. In a device of the class described, the combination of a gear shifting rod, means adapted to be connected to said rod to move the same into position to set the gears and also adapted to be connected to said rod to return the same to normal position, said rod being free of any restraining means during its entire movement into normal postion.

31. In a device of the class described, a pair of sliding frames mounted to move in parallel planes and connected to move in relatively opposite directions, a gear shifting rod, an electromagnet fixed to said rod positioned between the frames and provided with a spring pressed plunger normally disposed in the path of one of the frames and adapted to withdraw the plunger from the said path and position it in the path of the other frame whereby the rod is moved by the engagement of the plunger with one of the frames and means for moving the frames.

32. In a device of the class described, a pair of sliding frames mounted to move in parallel planes and connected to move in relatively opposite directions, a plurality of gear shifting rods each rod having an electromagnet mounted thereon and provided with a plunger adapted to be projected into the path of one of the frames and selective means for energizing one of the electromagnets to connect the same with one of the frames, whereby the motion of the frame is conveyed to the rod to move the same.

33. In a device of the class described, the combination of a power member mounted for reciprocatory movement, a gear shifting member mounted for reciprocatory movement parallel to said power member, an electromagnet mounted on one of said members and provided with a plunger adapted to be projected across the path of the other member thereby to connect said members to shift the gear shifting member into position and means for holding said gear shifting member resiliently in its shifted position.

34. In a device of the class described, the combination of a plurality of gear shifting rods, an electromagnet having a plunger, electromagnetically controlled selective means for connecting any one of said rods to said plunger to move the connected rod at will in either of its longitudinal directions.

35. In a device of the class described, the combination of a plurality of gear shifting rods, an electromagnet having a plunger, magnetically controlled selective means for connecting any one of said rods to said plunger to move the connected rod at will in either of its longitudinal directions, and a single switch for controlling said electromagnet and said means, said means being idle while said electromagnet is energized.

36. In a device of the class described, the combination of an actuator member, means operatively associated with said member to store energy of the same and to cause the member to move under the force of said stored energy, a controlled member actuated by said moving actuator member and a clutch between said actuator member and said controlled member, said clutch designed to be moved into clutching engagement simultaneously with the movement of said actuator member into operative engagement with said actuator member.

37. In a device of the class described, the combination of a member mounted for reciprocatory movement, a gear shifting rod having an electromagnet of the plunger type, the plunger of said electromagnet being normally projected into the path of movement of said member whereby the member will engage the plunger to actuate the shift rod, said electromagnet adapted when energized to move its plunger out of said path.

38. In a device of the class described, the combination with an actuating member, an actuator electromagnet for controlling the same, an actuated member, a clutch mechanism for connecting the actuating with the actuated member, an electromagnet controlling said clutch mechanism, of a circuit including said actuator electromagnet, the clutch controlling electromagnet being cooperatively associated with said actuator electromagnet, a switch having a pair of contacts, one of said contacts connected electrically to the actuator electromagnet and the other contact connected electrically to the clutch controlling electromagnet and a single contact lever adapted to be moved into engagement with either of the contacts to actuate the electromagnet connected therewith, said lever being out of engagement with one of the contacts when completely engaged with the other.

39. In a device of the class described, the combination with an actuating member, of an actuated member shiftable from an operative into an inoperative position and the reverse, a plunger electromagnet operatively connected to the actuated member and the plunger of which normally is positioned to be engaged by the actuating member to shift the actuated member from its operative to its inoperative position and designed when the electromagnet is energized to project the plunger into position to be engaged by the actuating member to shift the actuated member from its inoperative to its operative position.

40. In a device of the class described, the combination with an actuating member and an actuated member, the latter movable from an inoperative into an operative position, of means for connecting said members whereby the actuated member is shifted from one of its positions into the other by said actuating member, said means comprising a connecting member normally positioned to connect the members so that a movement of the actuating member will automatically move the actuated member into its inoperative position and means for adjusting the position of said connecting member to provide an engagement so that a movement of the actuating member will cause said actuated member to be moved into an operative position.

Signed at New York city in the county of New York and State of New York this 11th day of January, A. D. 1915.

HOWARD J. MURRAY.

Witness:
M. J. COOPER.